US012334683B2

(12) United States Patent
Matsuo

(10) Patent No.: US 12,334,683 B2
(45) Date of Patent: Jun. 17, 2025

(54) CPA ATTACHMENT STRUCTURE, CPA-ATTACHED CONNECTOR AND WIRE HARNESS

(71) Applicant: Yazaki Corporation, Tokyo (JP)

(72) Inventor: Takahiro Matsuo, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 312 days.

(21) Appl. No.: 18/315,717

(22) Filed: May 11, 2023

(65) Prior Publication Data

US 2023/0378694 A1 Nov. 23, 2023

(30) Foreign Application Priority Data

May 19, 2022 (JP) ................................ 2022-082319

(51) Int. Cl.

| | |
|---|---|
| ***H01R 13/641*** | (2006.01) |
| ***H01B 7/00*** | (2006.01) |
| ***H01R 13/436*** | (2006.01) |
| ***H01R 13/627*** | (2006.01) |
| ***H01R 13/639*** | (2006.01) |

(52) U.S. Cl.

CPC ......... *H01R 13/641* (2013.01); *H01B 7/0045* (2013.01); *H01R 13/4365* (2013.01); *H01R 13/6273* (2013.01); *H01R 13/639* (2013.01)

(58) Field of Classification Search

None

See application file for complete search history.

(56) References Cited

U.S. PATENT DOCUMENTS

| | | | | |
|---|---|---|---|---|
| 6,780,045 B2 * | 8/2004 | Shuey | H01R 13/641 | 439/352 |
| 7,909,638 B2 * | 3/2011 | Seo | H01R 13/6272 | 439/352 |
| 8,747,146 B2 * | 6/2014 | Brown | H01R 13/639 | 439/489 |
| 2001/0005648 A1 | 6/2001 | Kurimoto | | |
| 2001/0029124 A1 | 10/2001 | Hasegawa | | |
| 2017/0250502 A1 | 8/2017 | Endo et al. | | |
| 2020/0212627 A1 | 7/2020 | Saito | | |

FOREIGN PATENT DOCUMENTS

WO 2009/047744 A2 4/2009

* cited by examiner

*Primary Examiner* — Tho D Ta

(74) *Attorney, Agent, or Firm* — Sughrue Mion, PLLC

(57) ABSTRACT

A CPA attachment structure capable of suppressing increase in connector size, a CPA-attached connector and a wire harness are provided. A CPA-side lock structure of the CPA attachment structure includes a pair of arms provided so as to be bendable in an in-plane direction of a housing outer surface, a CPA-side lock portion which is temporarily locked to a connector-side lock structure and which is released from the temporary locking at a time of fitting. The connector-side lock structure includes a pair of ribs that are arranged to stand according to an arrangement interval of the pair of arms, a temporary lock portion to which the CPA-side lock portion is temporarily locked, and a final lock portion to which the CPA-side lock portion is finally locked.

10 Claims, 8 Drawing Sheets

CPA ATTACHMENT STRUCTURE, CPA-ATTACHED CONNECTOR AND WIRE HARNESS

TECHNICAL FIELD

The present invention relates to a CPA (Connector Position Assurance) attachment structure for attaching a CPA member to a connector housing, and to a CPA-attached connector including, as an optional component, the CPA member that is attachable by the attachment structure. Further, the present invention relates to a wire harness including on its end the above-described CPA-attached connector.

BACKGROUND

Conventionally, a CPA-attached connector is known in which a CPA member for ensuring fitting to a mating connector housing is attached to a connector housing (e.g., see Patent Document 1). A CPA-attached connector described in Patent Document 1 has a structure in which a CPA member having cantilever-shaped arms are attached to the connector housing, the cantilever-shaped arms being bendable in an out-of-plane direction with respect to an outer surface of the connector housing. A protrusion for locking is provided at a free end of the arm of the CPA member, and, prior to performing the fitting to a mating connector housing, a temporarily locked state is established where this protrusion interferes with a part of the connector housing and the sliding is prohibited. Then, at a time of the fitting to the mating connector housing, this mating connector housing pushes the protrusion for locking from above, thereby releasing the interference and permitting the sliding. As a result, the CPA member slides further and is finally locked to the connector housing, and this final locking ensures the fitting with respect to the mating connector housing.

RELATED ART DOCUMENT

Patent Document

Patent Document 1: Japanese Patent No. 6213592

SUMMARY OF THE INVENTION

Problem to be Solved by the Invention

In recent years, there are cases where the CPA member is attached to a small connector such as a board-mounted type connector. In the CPA attachment structure as employed in the CPA-attached connector described in Patent Document 1, the arms of the CPA member are bent in an out-of-plane direction with respect to an outer surface of the connector housing to transit from the temporary locking to the final locking. Such a structure tends to have an increased size of the CPA-attached connector with respect to the out-of-plane direction described above. On the other side, for the small connectors such as board-mounted type connectors, such an increase in the connector size is not desirable.

Thus, in view of the problem as described above, an object of the present invention is to provide a CPA attachment structure capable of suppressing the increase in the connector size, a CPA-attached connector and a wire harness.

Solution to Problem

In order to solve the above-described problem, the present invention provides, in a first aspect, a CPA attachment structure including a CPA-side lock structure provided at a CPA member, the CPA member being configured to be temporarily locked to a connector housing and to be finally locked to the connector housing at a time of fitting to a mating connector housing to ensure fitting, the CPA-side lock structure being configured to bring the CPA member temporarily locked to the connector housing and finally locked to the connector housing at the time of the fitting, and a connector-side lock structure provided at the connector housing and configured to bring the CPA member temporarily locked and finally locked at the time of the fitting. The CPA-side lock structure includes a pair of arms each extending in a direction corresponding to a fitting direction and aligned in an in-plane direction of a housing outer surface at a time when the CPA member is temporarily locked to the connector housing, the pair of arms being bendable in the in-plane direction, and CPA-side lock portions provided at the pair of arms, respectively, the CPA-side lock portions being configured to be temporarily locked to the connector-side lock structure, the CPA-side lock portions being configured to be released from the temporary locking by the pair of arms being bent in the in-plane direction by the mating connector housing at the time of the fitting, and the CPA-side lock portions being configured to be finally locked to the connector-side lock structure by the CPA member being pushed in the fitting direction. The connector-side lock structure includes a pair of ribs standing on the housing outer surface at an interval corresponding to an arrangement interval of the pair of arms, the pair of ribs each extending in the fitting direction, temporary lock portions which are provided at the pair of ribs, respectively, and to which the CPA-side lock portions are temporarily locked, and final lock portions which are provided at the pair of ribs, respectively, on a front side in the fitting direction with respect to the temporary lock portions, and to which the CPA-side lock portions are finally locked.

Further, in order to solve the above-described problem, a CPA-attached connector includes a connector housing, a CPA member which is configured to be temporarily locked to the connector housing and finally locked to the connector housing at a time of fitting to a mating connector housing to ensure fitting, and the CPA attachment structure described above that is capable of attaching the CPA member as an optional component to the connector housing.

Further, in order to solve the above-described problem, a wire harness includes a harness body, and the CPA-attached connector described above provided at at least one end of the harness body.

Advantageous Effect of the Invention

According to the CPA attachment structure, the CPA-attached connector and the wire harness described above, it is possible to suppress the increase in the connector size.

DETAILED DESCRIPTION OF THE EXEMPLARY EMBODIMENT

Hereinafter, one embodiment of a CPA attachment structure, a connector housing, a CPA-attached connector, and a wire harness will be described.

Figure 1:
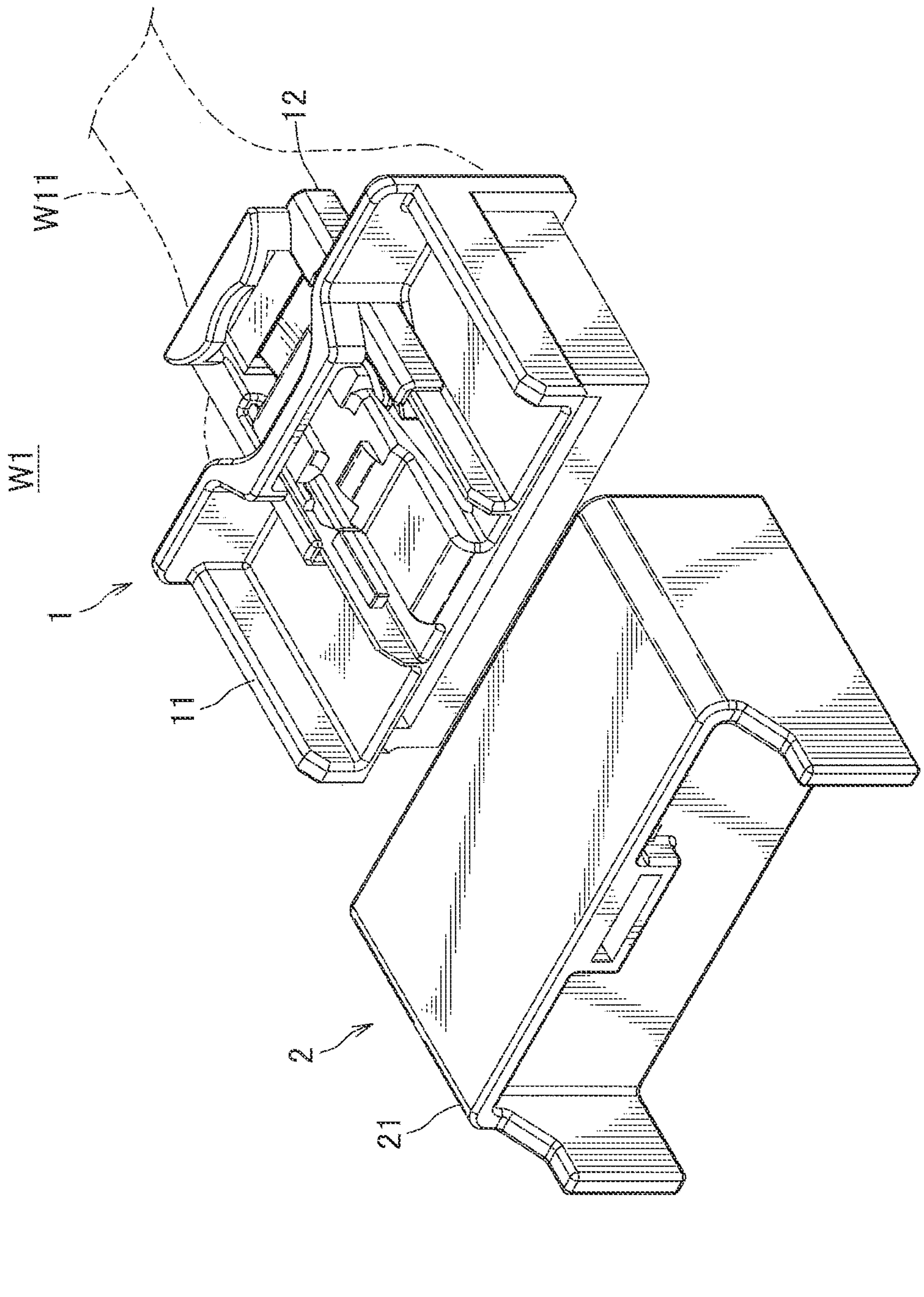
FIG. 1 is a perspective view of one embodiment of a wire harness including on its end a CPA-attached connector, viewed from a fitting side on which a mating connector is fitted.
Figure 2:
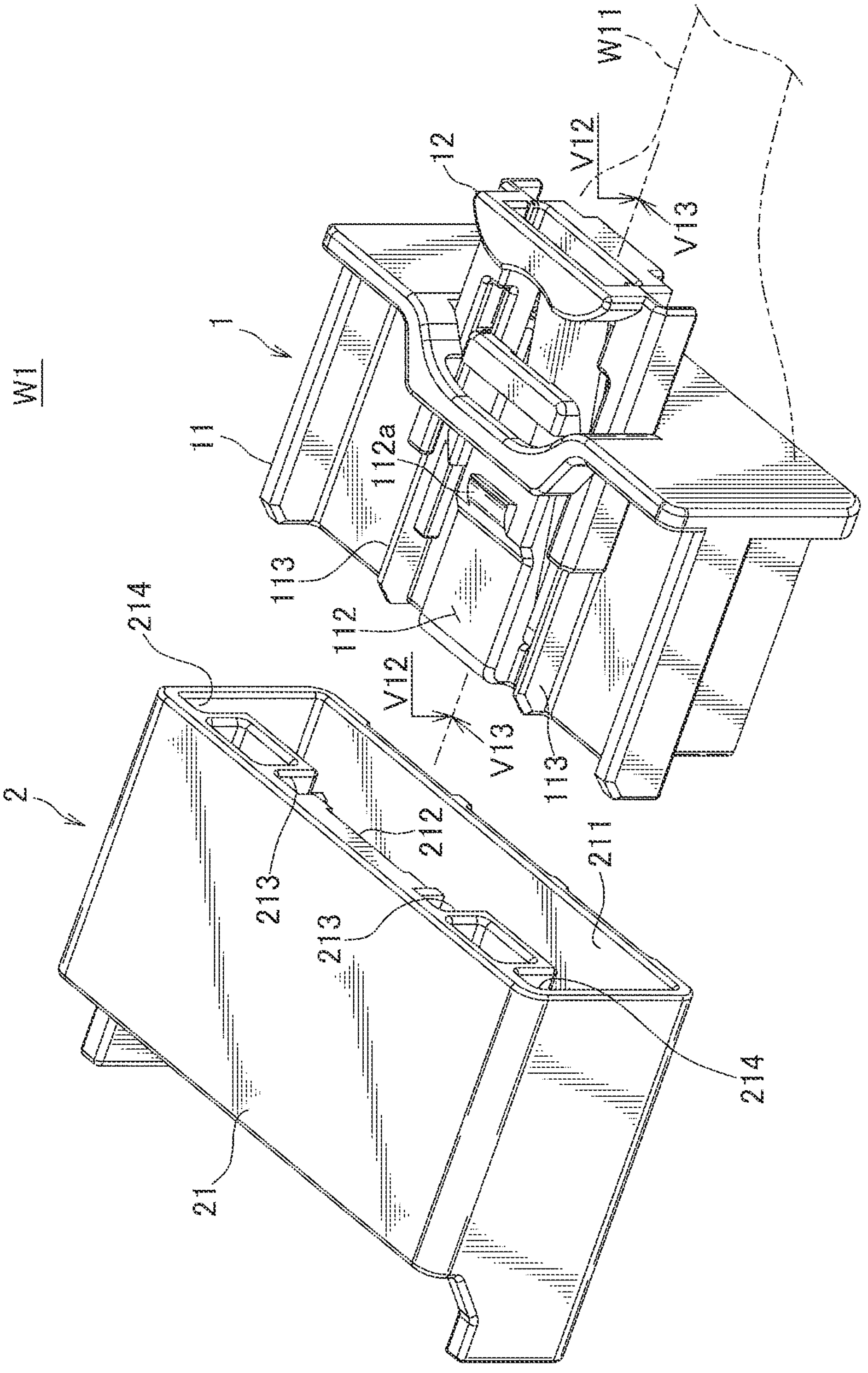
FIG. 2 is a perspective view of the wire harness shown in FIG. 1, viewed from an extending side on which an electric wire is extending out.

FIG. 1 is a perspective view of one embodiment of a wire harness including on its end a CPA-attached connector, viewed from a fitting side on which a mating connector is fitted, and FIG. 2 is a perspective view of the wire harness shown in FIG. 1, viewed from an extending side on which an electric wire is extending out.

A wire harness W1 shown in FIG. 1 and FIG. 2 includes a harness body W11 including a plurality of electric wires bundled together, and a CPA-attached connector 1 provided at one end of the harness body W11. The CPA-attached connector 1 at the one end is configured to be fitted to a mating connector 2 of a board-mounted type. In this embodiment, the mating connector 2 is a small connector which includes a mating connector housing 21 made of resin and having a flat rectangular tube-shape, and the mating connector housing 21 accommodates a plurality of male connector terminals (not shown) having a width of approximately 0.5 mm and configured to be soldered and fixed to a board. The CPA-attached connector 1 is a small female connector configured to be fitted to the small male mating connector 2. The CPA-attached connector 1 includes a connector housing 11 configured to accommodate a plurality of female connector terminals each crimped to an end of the electric wire, these plurality of female connector terminals, and a CPA member 12. The CPA member 12 is a member which can be attached as an optional component to the connector housing 11 and which is configured to be temporarily locked to the connector housing 11 and finally locked to the connector housing 11 at the time of fitting to the mating connector housing 21 to ensure the fitting. In FIG. 1 and FIG. 2, the CPA-attached connector 1 is shown in which the CPA member 12 is temporarily locked to the connector housing 11.

Figure 3:
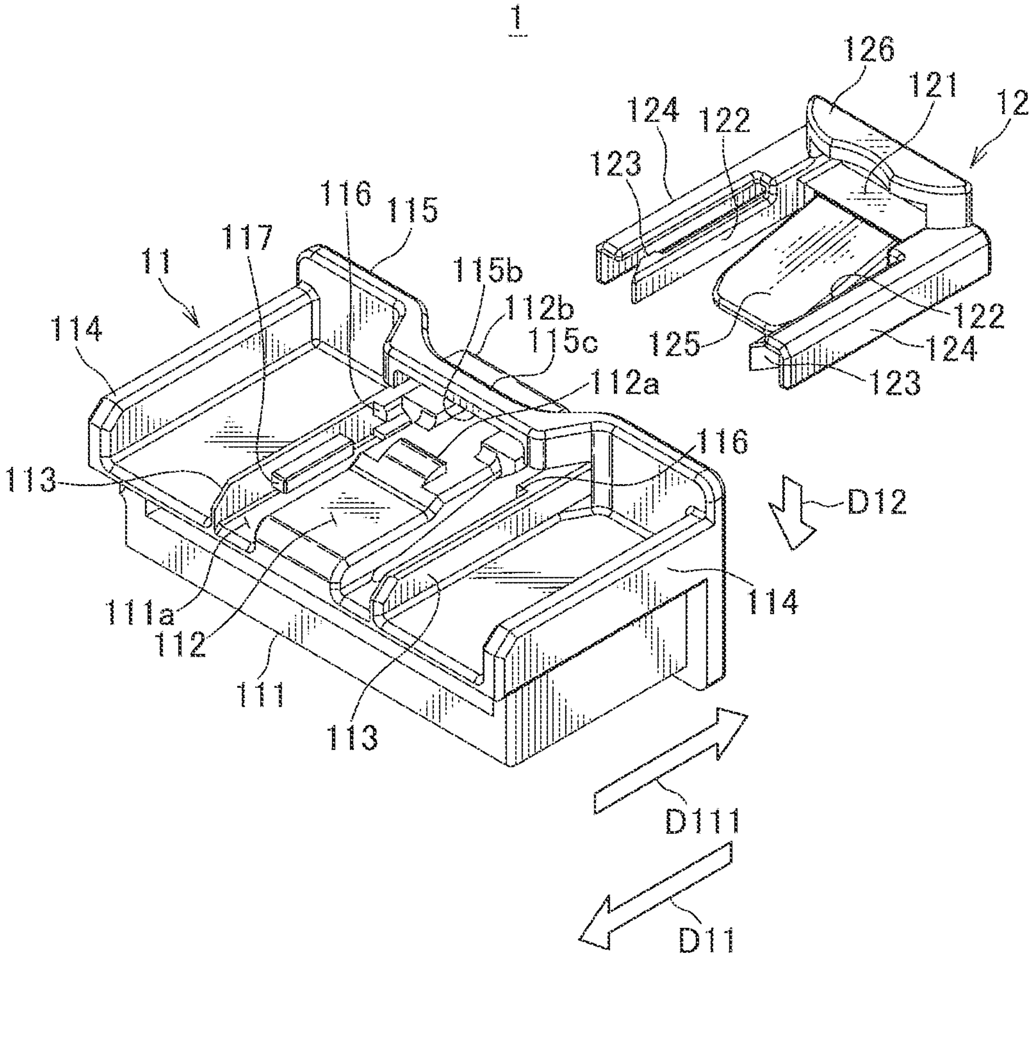
FIG. 3 is a perspective view showing the CPA-attached connector shown in FIG. 1 and FIG. 2, with a connector housing and a CPA member being separated.
Figure 4:
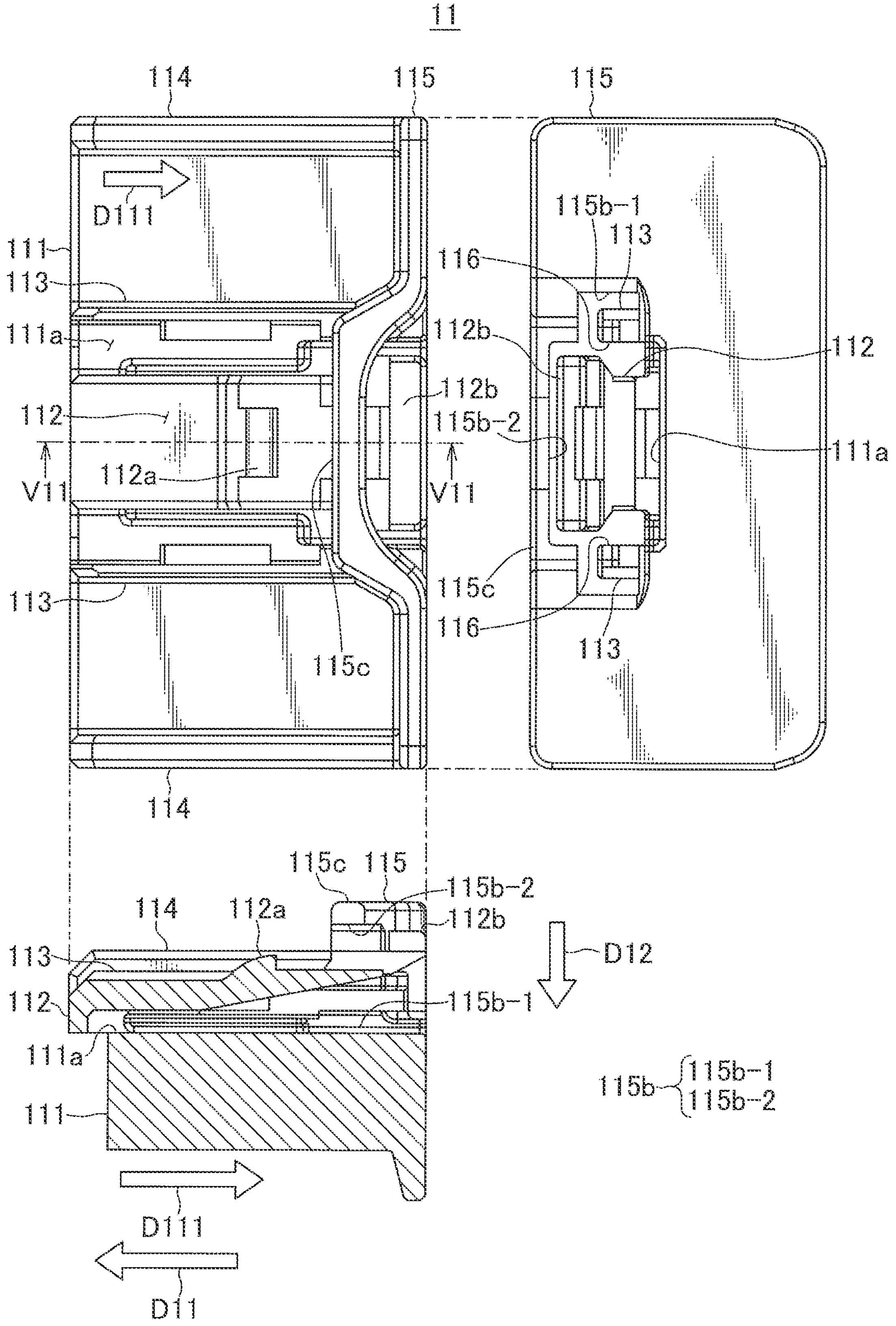
FIG. 4 shows the connector housing of FIG. 3 in a top view, rear view and cross-sectional view taken along a line V11-V11.

FIG. 3 is a perspective view showing the CPA-attached connector shown in FIG. 1 and FIG. 2, with the connector housing and the CPA member being separated, and FIG. 4 shows the connector housing of FIG. 3 in a top view, rear view and cross-sectional view taken along a line V11-V11. As used herein, “top” or “upper face” is defined as a face of the connector housing 11 on an upper side in the drawing on which the CPA member 12 is attached. Further, “rear” or “rear face” is defined as a face of the connector housing 11 from which the electric wires forming the harness body W11 shown in FIG. 1 and FIG. 2 extend.

The connector housing 11 shown in FIG. 3 and FIG. 4 is constituted of a connector housing body 111, a fit-lock portion 112, a pair of ribs 113, a pair of side wall ribs 114 and a rear face wall 115 that are integrally molded with a resin.

The connector housing body 111 is configured to be inserted into and fitted to an inner side of the rectangular tube-shaped mating connector housing 21 shown in FIG. 1 and FIG. 2. In this embodiment, the mating connector housing 21 is provided with a rectangular insertion opening 211 into which the connector housing body 111 is inserted at the time of the fitting, and the plurality of male connector terminals projects in a pin shape inside the insertion opening 211. The connector housing body 111 is inserted into the insertion opening 211 such that the plurality of female connector terminals accommodated in itself is fitted to the plurality of male connector terminals, thereby achieving the connector fitting.

The fit-lock portion 112 is provided on a housing outer surface 111*a* of the connector housing body 111 and is configured to be locked to an inner circumferential surface of the mating connector housing 21 at the time of the fitting. The fit-lock portion 112 is configured such that an end thereof on the front side in a fitting direction D11 is fixed to a housing outer surface 111*a*, and the fit-lock portion 112 extends in a cantilever shape toward the rear side in the fitting direction D11 with a gap from the housing outer surface 111*a*. At this time, as shown in FIG. 2, the mating connector housing 21 is provided with a locked portion 212 formed on an upper edge of an inner edge of the insertion opening 211 through which the connector housing body 111 is inserted at the time of the fitting. On the other hand, the fit-lock portion 112 includes a lock protrusion 112*a* that protrudes from a middle portion in an extending direction D111 of the fit-lock portion 112 and that is configured to be locked to the locked portion 212 of the mating connector housing 21. When the connector housing body 111 is inserted into the insertion opening 211, the cantilever-shaped fit-lock portion 112 is bent, allowing the lock protrusion 112*a* to move over the locked portion 212 of the mating connector housing 21.

Further, the fit-lock portion 112 includes an operation portion 112*b* provided on the rear side in the fitting direction D11 which is configured to be operated at the time of the release of the fitting. At the time of the release of the fitting, the operation portion 112*b* is pushed in a pushing direction D12 toward the housing outer surface 111*a* such that the fit-lock portion 112 is bent toward the housing outer surface 111*a*. This bending deformation releases the lock protrusion 112*a* from the locked portion 212 of the mating connector housing 21, allowing the connector housing body 111 to be pulled out from the mating connector housing 21 to release the fitting.

The pair of ribs 113 is provided on the housing outer surface 111*a* to guide the attachment of the CPA member 12 to the connector housing body 111 and to guide the final locking of the CPA member 12 at the time of the fitting. The pair of ribs 113 extends in the fitting direction D11, respectively, and stands so as to sandwich the fit-lock portion 112 between each other. As shown in FIG. 2, the upper edge on the inner edge of the insertion opening 211 of the mating connector housing 21 includes a pair of first fitting grooves 213 in which the pair of ribs 113 are fitted at the time of the fitting of the connector housing 11, the pair of first fitting grooves 213 sandwiching the locked portion 212 between each other.

In this embodiment, the pair of ribs 113 are arranged at an arrangement interval according to the transmission and reception form, the transmission and reception form including at least one of signal type or number of signals of an electric signal transmitted and received between the CPA-attached connector 1 and the mating connector 2. The pair of first fitting grooves 213 described above are fitting grooves arranged at an arrangement interval according to the above-described transmission and reception form such that the pair of ribs 113 can be fitted at the time of the fitting of the CPA-attached connector 1.

Further, as shown in FIG. 3 and FIG. 4, each rib of the pair of ribs 113 is provided with a temporary lock portion 116 to which the CPA member 12 is temporarily locked, and the final lock portion 117 to which the CPA member 12 is finally locked.

The pair of side wall ribs 114 stands on a pair of sides along the fitting direction D11 of the rectangular housing outer surface 111*a*. As shown in FIG. 2, a pair of second fitting grooves 214 are provided on both ends of the upper edge on the inner edge of the insertion opening 211 of the mating connector housing 21 so as to sandwich the pair of first fitting grooves 213 between each other, the pair of second fitting grooves 214 being configured such that the pair of side wall ribs 114 fit thereto at the time of the fitting of the connector housing 11.

The rear face wall 115 is a wall that covers the rear end in the fitting direction D11 of the connector housing body 111 with extend-out openings (not shown) though which the electric wires extend out from the connector housing body 111 opened. At the rear end of the connector housing body 111, the rear face wall 115 projects in an eave shape from an upper face side, i.e., an installation side where the fit-lock portion 112, the pair of ribs 113 and the pair of side wall ribs 114 are installed, and the rear face wall 115 also projects in an eave shape from the opposite lower face side. The rear face wall 115 is provided with an exposure window 115*b* through which the operation portion 112*b* and the pair of ribs 113 are exposed so as to enable the operation on the operation portion 112*b* at the time of the release of the fitting and enable the attachment of the CPA member 12.

A concave wall 115*c* as described below is provided at the projecting portion of the rear face wall 115 on the installation side (upper face side) on which the fit-lock portion 112, the pair of ribs 113 and the pair of side wall ribs 114 are installed. The concave wall 115*c* is a wall portion that is concave forward in the fitting direction D11 at a central portion of the projecting portion on the above-described upper face side, the central portion corresponding to the installation position where the fit-lock portion 112 and the pair of ribs 113 are installed. The exposure window 115*b* is formed through the concave wall 115*c* of the rear face wall 115. The operation portion 112*b* of the fit-lock portion 112 extends through the exposure window 115*b* toward the rear side in the fitting direction D11 and is exposed while being positioned within the concave wall 115*c*. A lower face side of the rear face wall 115 on the side opposite to the concave wall 115*c* is a portion which protrudes in a substantially single plate shape and on which an operator can put his/her finger when operating the operation portion 112. Further, the exposure window 115*b* is constituted of a first window portion 115*b*-1 on the lower face side and a second window portion 115*b*-2 on the upper face side. The first window portion 115*b*-1 is a window portion that opens in a strip shape along the housing outer surface 111*a* so that the pair of ribs 113 are exposed therethrough at both ends. The second window portion 115*b*-2 is a window portion which is narrower than the first window portion 115*b*-1 and which protrudes from a central portion of the first window portion 115*b*-1 in an upward direction away from the housing outer surface 111*a* and opens so as to expose the operation portion 112*b* therethrough.

The CPA member 12 configured to be attached to the above-described connector housing 11 is a member that includes a base portion 121, a pair of arms 122, CPA-side lock portions 123, a pair of guide rails 124, a restriction tongue piece 125 and a restriction bridge 126 which are integrally molded with a resin.

The base portion 121 is a rectangular block shaped portion.

The pair of arms 122 are arm portions each extending from the base portion 121 in a direction corresponding to the fitting direction D11 at a time when the CPA member 12 is temporarily locked to the connector housing 11. The pair of arms 122 are arranged in an in-plane direction of the housing outer surface 111*a* and are capable of being bent in the in-plane direction.

The CPA-side lock portion 123 is provided to each arm of the pair of arms 122 and is configured to be temporarily locked to the temporary lock portion 116 of the connector housing 11. At the time of the fitting to the mating connector housing 21, the pair of arms 122 is bent so the temporary locking is released, and by pushing the CPA member 12 in the fitting direction D11 it is finally locked to the final lock portion 117. The CPA-side lock portion 123 is a protrusion portion provided at a distal end of each arm of the pair of arms 122.

Further, the pair of ribs 113 described above stand with a gap so as to sandwich the pair of arms 122 between each other, and each of the temporary lock portion 116 and the final lock portion 117 is provided at each of the pair of ribs 113 on its facing surface facing the opposing rib 113. The CPA-side lock portion 123 of each arm 122 is configured to be locked to each of the temporary lock portion 116 and the final lock portion 117 from the side of the facing surface of each rib 113.

The pair of guide rails 124 is parallelly arranged on the outer side of the pair of arms 122 and is configured to guide the movement of the CPA member 12 in the fitting direction D11 along the pair of ribs 113 when the CPA member 12 is temporarily locked and finally locked. The pair of guide rails 124 covers a non-installation side of each of the pair of ribs 113 where the temporary lock portion 116 and the final lock portion 117 are not installed, thereby guiding the movement of the CPA member 12.

The restriction tongue piece 125 is a portion extending in a tongue shape from the base portion 121 between the pair of arms 122 and along the pair of arms 122, and is formed into a tapered shape having a thickness that decreases in the extending direction. At a time of the final locking, the restriction tongue piece 125 restricts the release of the fitting due to the bending of the fit-lock portion 112.

The restriction bridge 126 is a portion that connects the basal sides of the pair of arms 122 in a bridge-like manner with a gap from the base portion 121, the gap allowing the operation portion 112*b* of the fit-lock portion 112 to enter therethrough. The restriction bridge 126 restricts the pushing operation on the operation portion 112*b* at a time of the final locking.

The CPA member 12 described above is attached to the above-described connector housing 11 via a CPA attachment structure 3 described below so as to be temporarily locked and finally locked, thereby constituting the CPA-attached connector 1.

Figure 5:
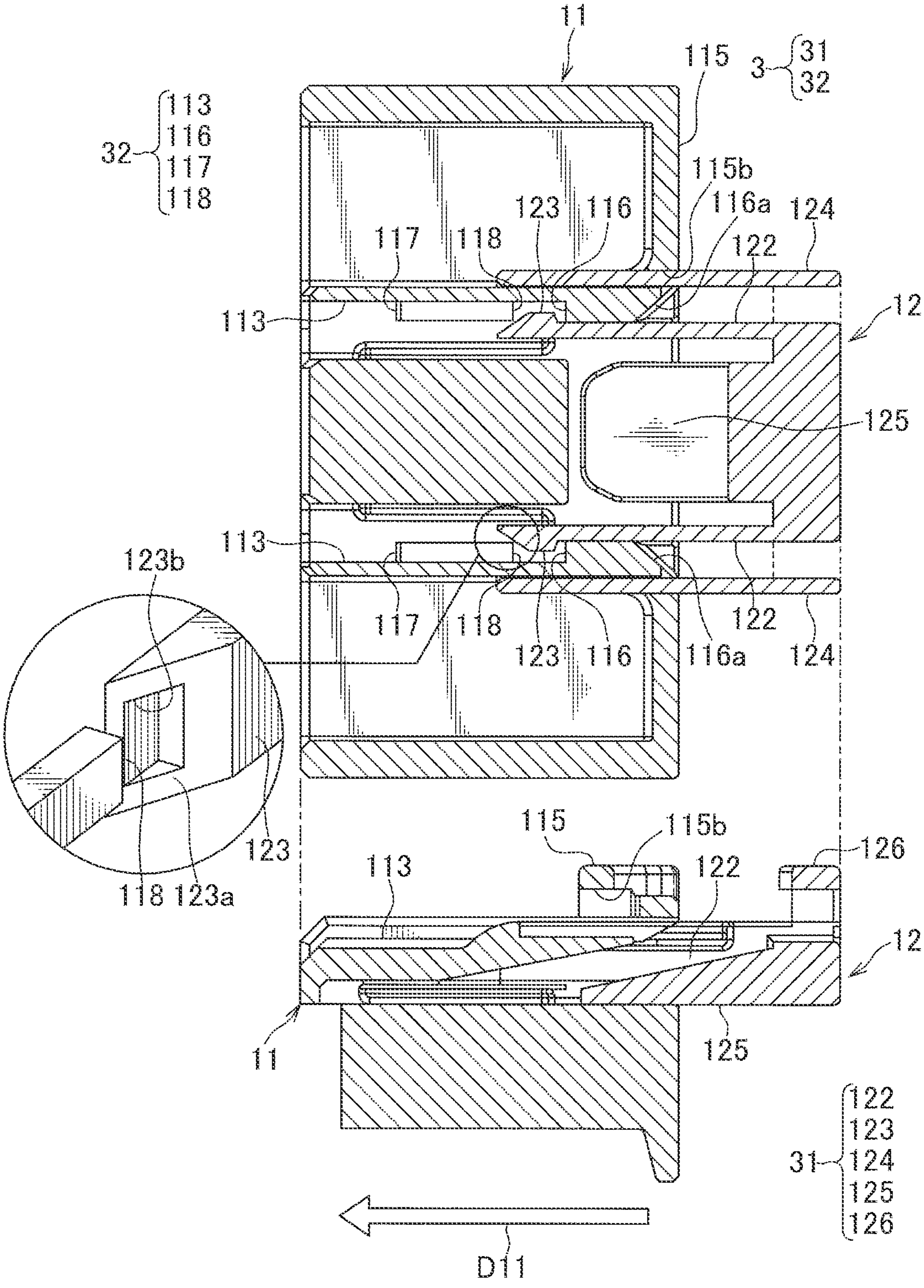
FIG. 5 shows cross-sectional views in cross sections taken along a line V12-V12 and a line V13-V13 in FIG. 2, respectively, illustrating how the CPA member is temporarily locked to the connector housing via the CPA attachment structure.

FIG. 5 shows cross-sectional views in cross sections taken along a line V12-V12 and a line V13-V13 in FIG. 2, respectively, illustrating how the CPA member is temporarily locked to the connector housing via the CPA attachment structure.

The CPA attachment structure 3 for attaching the CPA member 12 to the connector housing 11 includes a CPA-side lock structure 31 and a connector-side lock structure 32.

The CPA-side lock structure 31 is provided at the CPA member 12 and is configured to bring the CPA member 12 temporarily locked to the connector housing 11 and finally locked thereto at the time of the fitting. The CPA-side lock structure 31 includes the pair of arms 122, the CPA-side lock portions 123, the pair of guide rails 124, the restriction tongue piece 125 and the restriction bridge 126 of the CPA member 12 described above.

On the other hand, the connector-side lock structure 32 is provided at the connector housing 11 and is configured to bring the CPA member 12 temporarily locked and finally locked at the time of the fitting. The connector-side lock structure 32 includes the pair of ribs 113, the temporary lock portions 116 and the final lock portions 117 of the connector housing 11 described above.

The temporary lock portion 116 is a protrusion provided on the rear side in the fitting direction D11 of the facing surface of each of the pair of ribs 113. An end face on the front side in the fitting direction D11 of the temporary lock portion 116 is a perpendicular face perpendicular to the fitting direction D11, and at the time of the temporary locking, the rear side in the fitting direction D11 of the CPA-side lock portion 123 abuts thereon.

Further, an inclined face 123*a* is formed on the front side in the fitting direction D11 of each CPA-side lock portion 123, the inclined face 123*a* extending away from each arm 122 from the front side toward the rear side in the fitting direction D11. Further, an inclined face 116*a* is formed on the rear side in the fitting direction D11 of the temporary lock portion 116, the inclined face 116*a* extending away from each arm 122 from the rear side toward the front side in the fitting direction D11.

At a time when the CPA member 12 is temporarily locked to the connector housing 11, the CPA member 12 is attached such that it is inserted in the fitting direction D11 from the exposure window 115*b* on the rear face wall 115 of the connector housing 11 such that the pair of guide rails 124 follows the pair of ribs 113. At this time, the inclined faces 123*a* on the front sides of the CPA-side lock portions 123 abut against the inclined faces 116*a* on the rear sides of the temporary lock portions 116, and when inserted further, the pair of arms 122 is bent toward each other. Due to this bending, the CPA-side lock portions 123 travel so as to move over the temporary lock portions 116 in the fitting direction D11. The arms 122 restore their position once they get over the temporary lock portions 116, and the end faces on the rear sides of the CPA-side lock portions 123 are locked to the end faces on the front sides of the temporary lock portions 116.

The inclined face 123*a* on the front side of the CPA-side lock portion 123 includes a recess 123*b* into which a stopper part 118 as described below fits at the time of the temporary locking. The stopper part 118 is positioned between the final lock portion 117 and the temporary lock portion 116. Specifically, the stopper part 118 is an end face on the rear side in the fitting direction D11 of a rectangular parallelepiped protrusion that has the final lock portion 117 as its end face on the front side in the fitting direction D11. The recesses 123*b* on the front sides in the fitting direction D11 of the CPA-side lock portions 123 in the temporarily locked state abut on the stopper parts 118, by which the stopper parts 118 maintain the temporarily locked state of the CPA-side lock portions 123 until the pair of arms 122 are bent.

In this embodiment, the CPA member 12 can be added-on as an optional component, but in the case where the CPA member 12 is used, the CPA-attached connector 1 is handled with the CPA member 12 temporarily locked to the connector housing 11 via the CPA attachment structure 3. Then, when this CPA-attached connector 1 is fitted to the mating connector 2, the final locking of the CPA member 12 is performed, and the completion of this final locking ensures the connector fitting.

Figure 6:
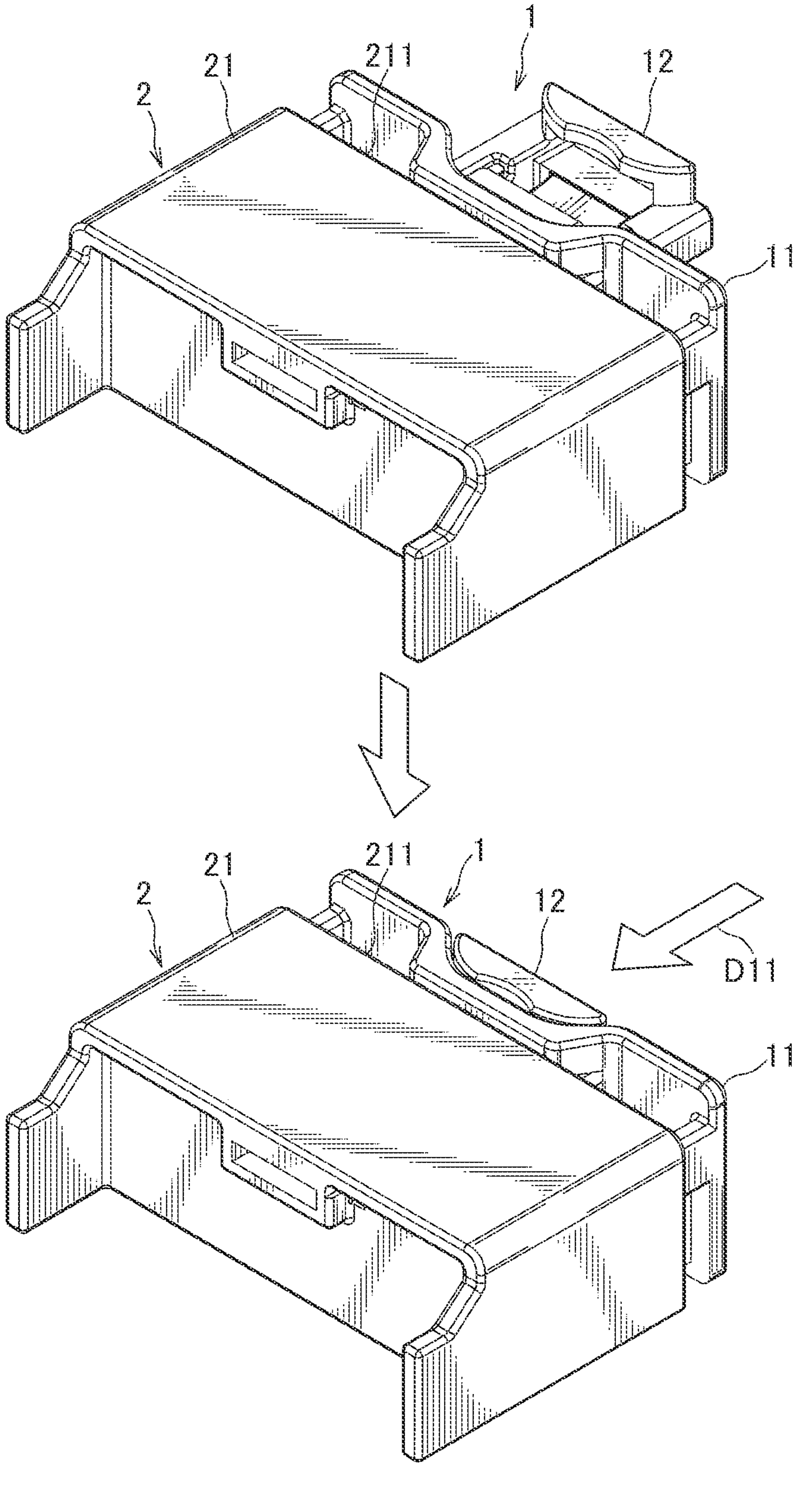
FIG. 6 is a perspective view illustrating how the CPA-attached connector in the temporarily locked state is fitted to the mating connector and then the CPA member is finally locked.

FIG. 6 is a perspective view illustrating how the CPA-attached connector in the temporarily locked state is fitted to the mating connector and then the CPA member is finally locked.

As shown in FIG. 6, in this embodiment, the CPA-attached connector 1 in the temporarily locked state is inserted and fitted to the insertion opening 211 of the mating connector 2. By this fitting, the above-described temporary lock of the CPA member 12 is released by the mating connector housing 21 as described later. As a result, the CPA member 12 can be pushed further in the fitting direction D11, and the final locking with respect to the connector housing 11 is performed.

Figure 7:
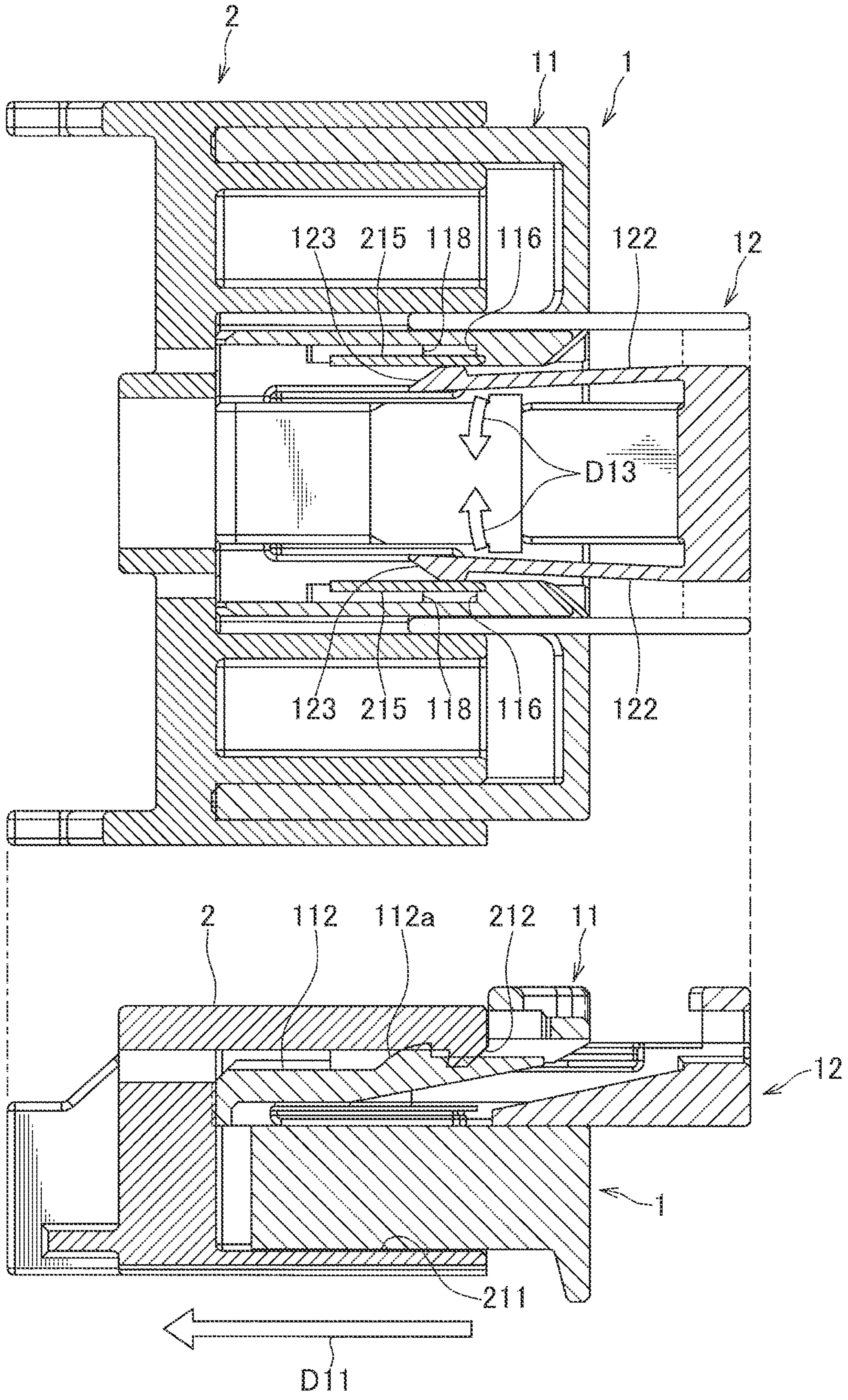
FIG. 7 shows cross-sectional views similar to FIG. 5, illustrating how the temporary locking of the CPA member is released when the CPA-attached connector in the temporarily locked state is fitted to the mating connector.

FIG. 7 shows cross-sectional views similar to FIG. 5, illustrating how the temporary locking of the CPA member is released when the CPA-attached connector in the temporarily locked state is fitted to the mating connector.

The upper edge of the insertion opening 211 of the mating connector 2 includes a pair of temporary lock release ribs 215 configured to enter between the temporary lock portion 116 of the connector housing 11 and the CPA-side lock portion 123 at the time of the fitting to the CPA-attached connector 1 to release the temporary locking.

At the time of the connector fitting, the CPA-attached connector 1 is fitted to the mating connector 2 in the fitting direction D11 until the lock protrusion 112*a* of the fit-lock portion 112 of the connector housing 11 is locked to the locked portion 212 of the mating connector 2. When the fitting proceeds to this point, the temporary lock release rib 215 enters between the temporary lock portion 116 and the stopper part 118, and CPA-side lock portion 123 as described above. As a result, the pair of arms 122 are bent toward each other in a bending direction D13. Due to this bending, the CPA-side lock portions 123 are unlocked from the temporary lock portions 116 and the stopper parts 118, thereby releasing the temporary locking. The final locking of the CPA member 12 is performed following this release of the temporary locking.

Figure 8:
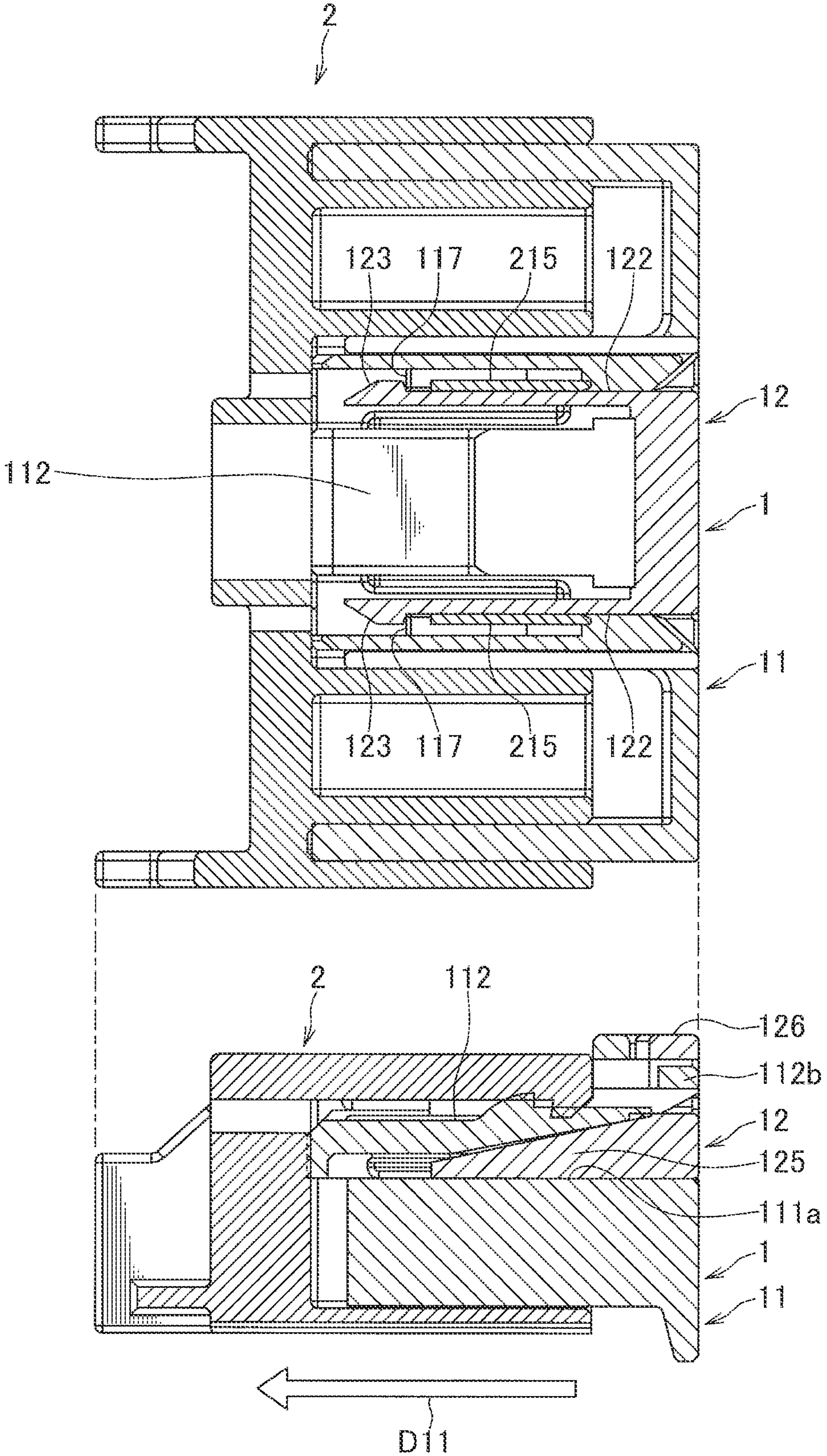
FIG. 8 shows cross-sectional views similar to FIG. 5, illustrating how the final locking of the CPA member is performed following the release of the temporary locking shown in FIG. 7.

FIG. 8 shows cross-sectional views similar to FIG. 5, illustrating how the final locking of the CPA member is performed following the release of the temporary locking shown in FIG. 7.

By the release of the temporary locking as described above, the CPA member 12 is capable of being moved further in the fitting direction D11. In this state, when the CPA member 12 is pushed in the fitting direction D11, the CPA member 12 travels in the fitting direction D11 with the CPA-side lock portions 123 moving over the temporary lock release ribs 215. Eventually, when the CPA-side lock portions 123 move beyond the temporary lock release ribs 215 and the final lock portions 117, the pair of arms 122 restores its position and the rear sides of the CPA-side lock portions 123 are locked to the final lock portions 117. This final locking of the CPA member 12 is permitted only when the connector housing 11 of the connector 1 is sufficiently fitted to the mating connector 2 as shown in FIG. 5 and the temporary locking is released. That is, the completion of this final locking of the CPA member 12 ensures the connector fitting.

Further, at a time of the final locking, the restriction tongue piece 125 of the CPA member 12 is inserted between the fit-lock portion 112 and the housing outer surface 111*a* of the connector housing 11, thereby restricting the release of the fitting due to the bending of the fit-lock portions 112. Further, at this time, the restriction bridge 126 of the CPA member 12 covers the side of the operation portion 112*b* of the fit-lock portion 112 that is opposite to the housing outer surface 111*a*, thereby restricting the pushing operation on the operation portion 112*b*.

According to the CPA attachment structure 3, the CPA-attached connector 1 and the wire harness W1 according to the embodiment described above, it is possible to provide the following advantageous effects. That is, according to this embodiment, the CPA-side lock structure 31 is provided with the pair of arms 122 bendable in the in-plane direction of the housing outer surface 111*a*, and the CPA-side lock portions 123 formed on the respective arms 122. On the other hand, the connector-side lock structure 32 is provided with the pair of ribs 113 arranged to stand at the interval corresponding to the arrangement interval of the pair of arms 122, and the temporal lock portion 116 and the final lock portion 117 formed on each rib 113. According to this CPA attachment structure 3, the deformation of the arms 122 for moving the CPA-side lock portions 123 from the temporary lock portions 116 to the final lock portions 117 is the deformation in the in-plane direction of the housing outer surface 111*a*. Further, the temporary lock portions 116 and the final lock portions 117 are also disposed on the ribs 113 arranged on the housing outer surface 111*a*. Thus, it is possible to suppress the increase in the connector size as compared to, for example, a structure in which the arms are configured to deform in an out-of-plane direction of the housing outer surface 111*a* and in which a locked portion to which the lock portion of the arm is locked is positioned distant from the housing outer surface 111*a*.

According to this embodiment, the temporary lock portions 116 and the final lock portions 117 are provided on the facing surfaces of the respective ribs of the pair of ribs 113. Further, the CPA-side lock portions 123 are configured such that the pair of arms 122 are bent toward each other by the mating connector housing 21 at the time of the fitting, thereby the temporary locking is released. According to this configuration, since the deformation of the arms 122 is kept between the pair of ribs 113, it is possible to further suppress the increase in the connector size.

Further, in this embodiment, the CPA-side lock portion 123 is a protrusion portion, and each of the temporary lock portion 116 and the final lock portion 117 is a portion on which the rear side in the fitting direction D11 of the CPA-side lock portion 123 abuts. In addition, the stopper part 118 on which the front side of the CPA-side lock portion 123 in the temporarily locked state abuts and which thereby maintains the temporarily locked state is provided between the temporary lock portion 116 and the final lock portion 117. According to this configuration, the temporarily locked state of the CPA-side lock portions 123 is maintained by the stopper parts 118 until the pair of arms 122 of the CPA-side lock portions 123 is bent, i.e., until the fitting to the mating connector housing 21 is performed. This maintenance can effectively prevent the occurrence of an event such as an unintended final locking of the CPA member 12 prior to the fitting to the mating connector housing 21.

Further, in this embodiment, the inclined face 123*a* is formed on the front side in the fitting direction D11 of each of the CPA-side lock portions 123 of the pair of arms 122. According to this configuration, for example, at a time of the temporary locking of the CPA member 12, the inclined face 123*a* described above abuts on the rear side of the temporary lock portion 116 and slides, by which it can be effectively moved over the temporary lock portion 116 to lock the CPA-side lock portion 123 to the temporary lock portion 116.

Further, in this embodiment, the CPA-side lock structure 31 is provided with the pair of guide rails 124. According to this configuration, the pair of guide rails 124 of the CPA-side lock structure 31 follows the pair of ribs 113 of the connector-side lock structure 32, thus the CPA member 12 can move smoothly in the fitting direction D11.

Further, in this embodiment, the connector housing 11 is provided with the fit-lock portion 112 having the cantilever shape. On the other hand, the CPA-side lock structure 31 is provided with the restriction tongue piece 125 that is inserted between the fit-lock portion 112 and the housing outer surface 111*a* at the time of the final locking to restrict the release of the fitting due to the bending of the fit-lock portion 112. According to this configuration, when the CPA member 12 is finally locked after the fitting to the mating connector housing 21, the above-described release of the fitting at the connector housing 11 is restricted by the restriction tongue piece 125 of the CPA member 12. This restriction can effectively maintain the fitting to the mating connector housing 21.

Further, in this embodiment, the connector housing 11 is provided with the fit-lock portion 112, and the CPA-side lock structure 31 is provided with the restriction bridge 126 that covers the operation portion 112*b* of the fit-lock portion 112 at the time of the final locking to restrict the pushing operation on the operation portion 112*b*. According to this configuration, when the CPA member 12 is finally locked after the fitting to the mating connector housing 21, the operation portion 112*b* of the fit-lock portion 112 is covered by the restriction bridge 126 of the CPA member 12 and the pushing operation is thus restricted. This restriction can effectively maintain the fitting to the mating connector housing 21.

Further, in this embodiment, the pair of ribs 113 are arranged at an arrangement interval corresponding to the transmission and reception form of a signal between the connectors. In addition, the mating connector 2 is provided with the pair of first fitting grooves 213 to which the pair of ribs 113 is fitted at the time of the fitting of the connector housing 11. For example, there may be cases where a plurality of connectors has connector terminals that are the same in number and arrangement form but different in the transmission and reception form, e.g., signal type and number of signals of electric signals to be transmitted to and received from the mating connector 2. Even in these cases, according to the above-described configuration, the corresponding relationship between the first fitting grooves 213 and the ribs 113 arranged at the arrangement interval corresponding to the transmission and reception form can prevent misconnection of the connectors with different transmission and reception forms.

Moreover, according to the connector housing 11, the CPA-attached connector 1 and the wire harness W1 of the above-described embodiment, it is possible to provide the following advantageous effects. That is, according to this embodiment, the pair of ribs 113 as an attachment portion for the CPA member 12 is arranged to stand on the housing outer surface 111*a* of the connector housing body 111 so as to sandwich the fit-lock portion 112 for the mating connector housing 21. That is, the attachment portion for the CPA member 12 is formed so as to substantially coincide with the fit-lock portion 112 in fitting direction D11. Further, the rear face wall 115 covering the rear end portion of the connector housing body 111 is provided with the exposure window 115*b* through which the operation portion 112*b* of the fit-lock portion 112 and the pair of ribs 113 are exposed. The operation on the operation portion 112*b* at the time of the release of the fitting and the attachment of the CPA member 12 are possible through this exposure window 115*b*. Thus, according to the connector housing 11 described above, the CPA member 12 can be attached through the exposure window 115*b* of the rear face wall 115. In addition, since the attachment portion for the CPA member 12 substantially coincides with the fit-lock portion 112 in the fitting direction D11, it is possible to suppress the increase in the connector size.

In this embodiment, the rear face wall 115 is projecting in the eave shape also on the side opposite to the installation side where the fit-lock portion 112 and the pair of ribs 113 are installed. This projecting portion on the opposite side is a portion on which an operator can put his/her finger when performing the operation on the operation portion 112*b*. According to this configuration, by putting the finger on the above-described projecting portion on the opposite side, the operation portion 112*b* exposed through the exposure window 115*b* can be pushed with good operability to unlock the fit-lock portion 112 from the mating connector housing 21.

Further, in this embodiment, the projecting portion on the installation side of the rear face wall 115 on which the fit-lock portion 112 and the pair of ribs 113 are installed is the concave wall 115*c*, and the exposure window 115*b* is formed through this concave wall 115*c*. The operation portion 112*b* extends through the exposure window 115*b* toward the rear side in the fitting direction D11 and is exposed while being positioned within the concave wall 115*c*. According to this configuration, since the operation portion 112*b* of the fit-lock portion 112 is positioned within the concave wall 115*c* of the rear face wall 115, it is possible to further suppress the increase in the connector size.

Further, in this embodiment, a part of the CPA member 12 covers the operation portion 112*b* inside the concave wall 115*c* at the time of the final locking, thereby restricting the pushing operation on the operation portion 112*b*. According to this configuration, since the pushing operation on the operation portion 112*b* of the fit-lock portion 112 is restricted by the part of the CPA member 12 at a time of the final locking, it is possible to effectively maintain the fitting to the mating connector housing 21.

Further, in this embodiment, the lock protrusion 112*a* is provided at the fit-lock portion 112, and the locked portion 212 is provided at the mating connector housing 21. According to this configuration, since the lock protrusion 112*a* is provided in the middle position of the cantilever-shaped fit-lock portion 112, the pushing operation on the operation portion 112*b* on the distal end side can effectively unlock the lock protrusion 112*a* from the locked portion 212 at the time of the release of the fitting.

Further, in this embodiment, the exposure window 115*b* is constituted of the first window portion 115*b*-1 through which the pair of ribs 113 is exposed and the second window portion 115*b*-2 through which the operation portion 112*b* is exposed. According to this configuration, by providing the exposure window 115*b* with the second window portion 115*b*-2 projecting from the first window portion 115*b*-1, the pair of ribs 113 and the operation portion 112*b* of the fit-lock portion 112 can be compactly arranged and exposed.

It should be noted that the embodiment described above only shows representative form of the CPA attachment structure, the connector housing, the CPA-attached connector and the wire harness. The CPA attachment structure, the connector housing, the CPA-attached connector and the wire harness are not limited thereto, these may be modified and implemented in various ways.

For example, in the above-described embodiment, the connector housing 11 having the rectangular tube-shape is shown as one example of the connector housing. However, the connector housing is not limited thereto, any shape such as cylindrical shape or elliptical cylindrical shape may be adopted for the specific connector shape.

Further, in the embodiment described above, the female CPA-attached connector 1 configured to be fitted to the male, board-mounted type mating connector 2 is shown as one example of the CPA-attached connector. However, the CPA-attached connector is not limited thereto, it may be a male connector that fits into a female mating connector. Moreover, the mating connector is not limited to the board-mounted type, it may be an end connector of the wire harness, etc.

Further, in the embodiment described above, the CPA attachment structure 3 including the pair of arms 122 configured to bend toward each other at the time of the fitting to thereby release the temporary locking is shown as one example of the CPA attachment structure. However, the CPA attachment structure is not limited thereto, and the bending direction of the pair of arms may be a direction opposite to that of the above-described embodiment as long as the temporary locking can be released at the time of the fitting. However, according to the CPA attachment structure 3 with the pair of arms 122 that bend toward each other, the deformation of the arms 122 is kept between the pair of ribs 113, thus the increase in the connector size can be further suppressed as described above.

In the embodiment described above, the CPA attachment structure 3 in which the CPA-side lock portion 123 is a protrusion portion and which includes the stopper part 118 arranged between the temporary lock portion 116 and the final lock portion 117 is shown as one example of the CPA attachment structure. However, the CPA attachment structure is not limited thereto, the CPA-side lock portion may be a lock hole or a lock recess or the like in which the temporary lock portion and the final lock portion can be fitted and locked, and the stopper part may be omitted. However, by adopting the protrusion-shaped CPA-side lock portion 123 and by providing the stopper part 118, it is possible to effectively suppress the occurrence of an event such as the unintended final locking as described above.

Further, in the embodiment described above, the CPA attachment structure 3 in which the inclined face 123*a* is formed on the front side of CPA-side locking portion 123 is shown as one example of the CPA attachment structure.

However, the CPA attachment structure is not limited thereto, the front end face of the CPA-side lock portion may be a flat face, a concave face, or a convex face, etc. However, with the inclined face 123*a* formed on the front side of CPA-side lock portion 123, it can effectively move over the temporary lock portion 116 and the CPA-side lock portion 123 can be locked thereto at the time of the temporary locking as described above.

Further, in the embodiment described above, the CPA attachment structure 3 provided with the pair of guide rails 124 is shown as one example of the CPA attachment structure. However, the CPA attachment structure is not limited thereto, it may not be provided with the guide rails as described above. However, by providing the pair of guide rails 124, the CPA member 12 can be moved smoothly in the fitting direction D11 as described above.

Further, in the embodiment described above, the CPA attachment structure 3 including the restriction tongue piece 125 that restricts the release of the fitting due to the bending of the fit-lock portion 112 at the time of the final locking is shown as one example of the CPA attachment structure. However, the CPA attachment structure is not limited thereto, it may not be provided with the restriction tongue piece as described above. However, by providing the restriction tongue piece 125, it is possible to effectively maintain the fitting to the mating connector housing 21 as described above.

Further, in the above-described embodiment, the CPA attachment structure 3 including the restriction bridge 126 that restricts the pushing operation on the operation portion 112*b* of the fit-lock portion 112 at the time of the final locking is shown as one example of the CPA attachment structure. However, the CPA attachment structure is not limited thereto, it may not be provided with the restriction bridge as described above. However, by providing the restriction bridge 126, it is possible to effectively maintain the fitting to the mating connector housing 21 as described above.

Further, in the embodiment described above, the CPA attachment structure 3 in which the pair of ribs 113 are disposed at the arrangement interval according to the transmission and reception form of the signal is shown as one example of the CPA attachment structure. However, the CPA attachment structure is not limited thereto, the pair of ribs may be disposed at a unique arrangement interval independently of the transmission and reception form of the signal. However, by providing the pair of ribs 113 at the arrangement interval according to the transmission and reception form, it is possible to prevent misconnection of the connectors with the same terminal arrangements and such but with different signal transmission/reception forms as described above.

Further, in the embodiment described above, the connector housing 11 that includes the rear face wall 115 projecting in the eave shape also on the side opposite to the installation side where the fit-lock portion 112 and the pair of ribs 113 are installed is shown as one example of the connector housing. However, the connector housing is not limited thereto, and the rear face wall may be arranged not to project for the above-described opposite side. However, by adopting the rear face wall 115 which projects also on the above-described opposite side, it is possible to unlock the fit-lock portion 112 from the mating connector housing 21 with good operability as described above.

Further, in the embodiment described above, the connector housing 11 in which the concave wall 115*c* is provided on the rear face wall 115 and the exposure window 115*b* is formed through the concave wall 115*c* is shown as one example of the connector housing. However, the connector housing is not limited thereto, the rear face wall may have a simple flat plate shape, and the exposure window may be formed therethrough. However, by providing the exposure window 115*b* through the concave wall 115*c* of the rear face wall 115, it is possible to further suppress the increase in the connector size as described above.

Further, in the embodiment described above, the connector housing 11 in which a part of the CPA member 12 restricts the pushing operation on the operation portion 112*b* of the fit-lock portion 112 at the time of the final locking is shown as one example of the connector housing. However, the connector housing is not limited thereto, it may be configured such that the CPA member and the operation portion are disposed apart from each other. However, by adopting the restriction structure in which a part of the CPA member 12 provides restriction for the operation portion 112*b*, the fitting to the mating connector housing 21 can be maintained effectively as described above.

Further, in the embodiment described above, the connector housing 11 in which the lock protrusion 112*a* is formed in the middle of the fit-lock portion 112 including the operation portion 112*b* at its distal end is shown as one example of the connector housing. However, the connector housing is not limited thereto, the formation position of the lock protrusion may be any position on the fit-lock portion. However, by providing the lock protrusion 112*a* in the middle, it is possible to effectively unlock the lock protrusion 112*a* from the locked portion 212 by the pushing operation on the operation portion 112*b* at the distal end as described above.

Further, in the above-described embodiment, the connector housing 11 in which the exposure window 115*b* is constituted of the first window portion 115*b*-1 for the ribs 113 and the second window portion 115*b*-2 for the operation portion 112*b* is shown as one example of the connector housing. However, the connector housing is not limited thereto, and the shape of the exposure window may be any shape. However, by adopting the exposure window 115*b* constituted of the first window portion 115*b*-1 and the second window portion 115*b*-2, the pair of ribs 113 and the operation portion 112*b* can be compactly arranged and exposed as described above.

LIST OF REFERENCE SIGNS

1 CPA-attached connector
2 mating connector
3 CPA attachment structure
11 connector housing
12 CPA member
21 mating connector housing
31 CPA-side lock structure
32 connector-side lock structure
111 connector housing body
111*a* housing outer surface
112 fit-lock portion
112*a* lock protrusion
112*b* operation portion
113 rib
114 side wall rib
115 rear face wall
115*b* exposure window
115*b*-1 first window portion
115*b*-2 second window portion
115*c* concave wall

116 temporary lock portion
117 final lock portion
118 stopper part
121 base portion
122 arm
123 CPA-side lock portion
123*a* inclined face
123*b* recess
124 guide rail
125 restriction tongue piece
126 restriction bridge
211 insertion opening
212 locked portion
213 first fitting groove
214 second fitting groove
215 temporary lock release rib
D11 fitting direction
D12 pushing direction
D13 bending direction
D111 extending direction
W1 wire harnesses
W11 harness body

What is claimed is:

1. A CPA attachment structure comprising:

a CPA-side lock structure provided at a CPA member, the CPA member being configured to be temporarily locked to a connector housing and to be finally locked to the connector housing at a time of fitting to a mating connector housing to ensure fitting, the CPA-side lock structure being configured to bring the CPA member temporarily locked to the connector housing and finally locked to the connector housing at the time of the fitting; and a connector-side lock structure provided at the connector housing and configured to bring the CPA member temporarily locked and finally locked at the time of the fitting, wherein the CPA-side lock structure includes:

a pair of arms each extending in a direction corresponding to a fitting direction and aligned in an in-plane direction of a housing outer surface at a time when the CPA member is temporarily locked to the connector housing, the pair of arms being bendable in the in-plane direction; and CPA-side lock portions provided at the pair of arms, respectively, the CPA-side lock portions being configured to be temporarily locked to the connector-side lock structure, the CPA-side lock portions being configured to be released from the temporary locking by the pair of arms being bent in the in-plane direction by the mating connector housing at the time of the fitting, and the CPA-side lock portions being configured to be finally locked to the connector-side lock structure by the CPA member being pushed in the fitting direction, and wherein the connector-side lock structure includes:

a pair of ribs standing on the housing outer surface at an interval corresponding to an arrangement interval of the pair of arms, the pair of ribs each extending in the fitting direction;

temporary lock portions which are provided at the pair of ribs, respectively, and to which the CPA-side lock portions are temporarily locked; and final lock portions which are provided at the pair of ribs, respectively, on a front side in the fitting direction with respect to the temporary lock portions, and to which the CPA-side lock portions are finally locked.

2. The CPA attachment structure according to claim 1, wherein the pair of ribs are arranged to stand so as to sandwich the pair of arms between each other, each of the temporary lock portion and the final lock portion is provided on a facing surface of each rib of the pair of ribs that faces the rib on an opposing side, and at the time of the fitting, the CPA-side lock portions are released from the temporary locking by the pair of arms being bent toward each other by the mating connector housing.

3. The CPA attachment structure according to claim 1, wherein the CPA-side lock portions are protrusion portions provided at the pair of arms, respectively, each of the temporary lock portion and the final lock portion is a portion on which a rear side in the fitting direction of the CPA-side lock portion abuts, and each rib of the pair of ribs includes a stopper part provided between the temporary lock portion and the final lock portion, the stopper part being configured such that a front side in the fitting direction of the CPA-side lock portion that is in a temporarily locked state abuts on the stopper part, thereby maintaining the temporarily locked state of the CPA-side lock portion until the pair of arms is bent.

4. The CPA attachment structure according to claim 3, wherein an inclined face is formed on a front side in the fitting direction of the CPA-side lock portion of each arm of the pair of arms, the inclined face extending away from each arm from a front side toward a rear side in the fitting direction.

5. The CPA attachment structure according to claim 1, wherein the CPA-side lock structure further includes a pair of guide rails that is provided at the CPA member and arranged parallel to the pair of arms, the pair of guide rails being configured to, when the CPA member is being temporarily locked and when the CPA member is being finally locked, cover a non-installed side of each rib of the pair of ribs where the temporary lock portion and the final lock portion are not installed, thereby guiding movement of the CPA member in the fitting direction along the pair of ribs.

6. The CPA attachment structure according to claim 1, wherein the connector housing is configured to be inserted into and fitted to an inner side of the mating connector housing having a tubular shape, a fit-lock portion is disposed between the pair of ribs on the housing outer surface of the connector housing, an end of the fit-lock portion on a front side in the fitting direction being fixed to the housing outer surface, the fit-lock portion extending in a cantilever shape toward a rear side in the fitting direction with a gap from the housing outer surface, the fit-lock portion being configured such that, at the time of the fitting, the fit-lock portion is locked to an inner circumferential surface of the mating connector housing, and at a time of release of fitting, the fit-lock portion is bent toward the housing outer surface and unlocked from the inner circumferential surface, and the CPA-side lock structure further includes a restriction tongue piece provided at the CPA member and extending in a tongue piece shape between the pair of arms and along the pair of arms, the restriction tongue piece being configured to be inserted between the fit-lock portion and the housing outer surface at a time of final locking, thereby restricting the release of fitting due to the bending of the fit-lock portion.

7. The CPA attachment structure according to claim 1, wherein the connector housing is configured to be inserted into and fitted to an inner side of the mating connector housing having a tubular shape, a fit-lock portion is provided between the pair of ribs on the housing outer surface of the connector housing, an end of the fit-lock portion on a front side in the fitting direction being fixed to the housing outer surface, the fit-lock portion extending in a cantilever shape toward a rear side in the fitting direction with a gap from the housing outer surface, the fit-lock portion being configured such that, at he time of the fitting, the fit-lock portion is locked to an inner circumferential surface of the mating connector housing, and at a time of release of fitting, the fit-lock portion is bent toward the housing outer surface due to pushing of an operation portion of the fit-lock portion toward the housing outer surface and unlocked from the inner circumferential surface, the operation portion being disposed on the fit-lock portion on a rear side in the fitting direction, and the CPA-side lock structure includes a restriction bridge provided at the CPA member, the restriction bridge connecting in a bridge-like manner basal sides of the pair of arms so as to cover, at a time of final locking, a side of the operation portion of the fit-lock portion opposite to the housing outer surface to restrict a pushing operation on the operation portion.

8. The CPA attachment structure according to claim 1, wherein the pair of ribs are arranged at an arrangement interval according to a transmission and reception form, the transmission and reception form including at least one of signal type or number of signals of an electric signal transmitted and received between a connector including the connector housing and a mating connector including the mating connector housing, and the mating connector includes a pair of fitting grooves to which the pair of ribs is fitted at the time of the fitting of the connector housing.

9. A CPA-attached connector comprising:

a connector housing;

a CPA member which is configured to be temporarily locked to the connector housing and finally locked to the connector housing at a time of fitting to a mating connector housing to ensure fitting, and the CPA attachment structure according to claim 1 that is capable of attaching the CPA member as an optional component to the connector housing.

10. A wire harness comprising:

a harness body; and the CPA-attached connector according to claim 9 provided at at least one end of the harness body.

* * * * *